US009053558B2

(12) United States Patent
Shen

(10) Patent No.: US 9,053,558 B2
(45) Date of Patent: Jun. 9, 2015

(54) METHOD AND SYSTEM FOR FUSING MULTIPLE IMAGES

(71) Applicant: Rui Shen, Edmonton (CA)

(72) Inventor: Rui Shen, Edmonton (CA)

( * ) Notice: Subject to any disclaimer, the term of this patent is extended or adjusted under 35 U.S.C. 154(b) by 98 days.

(21) Appl. No.: 13/952,495

(22) Filed: Jul. 26, 2013

(65) Prior Publication Data

US 2015/0030242 A1 Jan. 29, 2015

(51) Int. Cl.
| | | |
|---|---|---|
| G06K 9/36 | (2006.01) | |
| G06T 5/50 | (2006.01) | |
| G06K 9/46 | (2006.01) | |
| G06T 5/00 | (2006.01) | |
| G06K 9/48 | (2006.01) | |

(52) U.S. Cl.
CPC .............. G06T 5/50 (2013.01); G06K 9/4652 (2013.01); G06T 5/008 (2013.01); G06T 5/009 (2013.01); G06K 9/481 (2013.01); *G06T 2207/20221* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 4,661,986 | A | 4/1987 | Adelson |
| 5,325,449 | A | 6/1994 | Burt et al. |
| 5,488,674 | A | 1/1996 | Burt et al. |
| 6,088,470 | A | 7/2000 | Camus et al. |
| 6,201,899 | B1 | 3/2001 | Bergen |
| 6,584,235 | B1 | 6/2003 | Fossum et al. |
| 6,816,627 | B2 | 11/2004 | Ockman |
| 6,879,731 | B2 | 4/2005 | Kang et al. |
| 6,898,331 | B2 | 5/2005 | Tiana |
| 6,912,324 | B2 | 6/2005 | Fossum et al. |
| 7,058,233 | B2 | 6/2006 | Silber |
| 7,148,861 | B2 | 12/2006 | Yelton et al. |
| 7,176,963 | B2 | 2/2007 | Ostromek |
| 7,340,099 | B2 | 3/2008 | Zhang |
| 7,443,443 | B2 | 10/2008 | Raskar et al. |
| 7,613,360 | B2 | 11/2009 | Ma et al. |

(Continued)

FOREIGN PATENT DOCUMENTS

| | | |
|---|---|---|
| WO | 0184828 A1 | 11/2001 |
| WO | 2006017233 A1 | 2/2006 |

(Continued)

OTHER PUBLICATIONS

Wang, C., et al., "First-order fusion of volumetric medical imagery," IEE Proceedings—Vision, Image and Signal Processing, Apr. 2006, pp. 191-198, vol. 153, No. 2.

(Continued)

*Primary Examiner* — Li Liu
(74) *Attorney, Agent, or Firm* — LeClairRyan, a Professional Corporation

(57) ABSTRACT

A method and system is provided for combining information from a plurality of source images to form a fused image. The fused image is generated by the combination of the source images based on both local features and global features computed from the source images. Local features are computed for local regions in each source image. For each source image, the computed local features are further processed to form a local weight matrix. Global features are computed for the source images. For each source image, the computed global features are further processed to form a global weight vector. For each source image, its corresponding local weight matrix and its corresponding global weight vector are combined to form a final weight matrix. The source images are then weighted by the final weight matrices to generate the fused image.

31 Claims, 5 Drawing Sheets

(56) References Cited

U.S. PATENT DOCUMENTS

| | | | |
|---|---|---|---|
| 7,623,683 | B2 | 11/2009 | Chen et al. |
| 7,636,098 | B2 | 12/2009 | Yang et al. |
| RE41,447 | E | 7/2010 | Tiana |
| 7,936,948 | B2 | 5/2011 | Chang et al. |
| 7,936,949 | B2 | 5/2011 | Riley et al. |
| 7,940,994 | B2 | 5/2011 | Aguilar |
| 8,111,300 | B2 | 2/2012 | Hwang et al. |
| 8,237,813 | B2 | 8/2012 | Garten |
| 8,320,712 | B2 | 11/2012 | Choi et al. |
| 8,339,475 | B2 | 12/2012 | Atanassov et al. |
| 8,406,569 | B2 | 3/2013 | Segall et al. |
| 8,411,938 | B2 | 4/2013 | Zhang et al. |
| 8,447,137 | B2 | 5/2013 | Buscema |
| 8,525,900 | B2 | 9/2013 | Garten |
| 8,805,111 | B2* | 8/2014 | Chaudhuri et al. ............ 382/260 |
| 8,885,976 | B1* | 11/2014 | Kuo et al. ..................... 382/276 |
| 2002/0015536 | A1 | 2/2002 | Warren et al. |
| 2005/0190990 | A1 | 9/2005 | Burt et al. |
| 2007/0247517 | A1 | 10/2007 | Zhang et al. |
| 2009/0278857 | A1 | 11/2009 | Wajs |
| 2010/0103194 | A1* | 4/2010 | Chen et al. .................... 345/629 |
| 2011/0025919 | A1 | 2/2011 | Vorontsov et al. |
| 2011/0064327 | A1 | 3/2011 | Dagher et al. |
| 2011/0147588 | A1 | 6/2011 | Chaudhuri et al. |
| 2011/0176024 | A1 | 7/2011 | Kwon et al. |
| 2011/0194788 | A1 | 8/2011 | Chaudhuri et al. |
| 2011/0221906 | A1* | 9/2011 | Xu et al. ....................... 348/148 |
| 2011/0293179 | A1 | 12/2011 | Dikmen et al. |
| 2012/0183210 | A1 | 7/2012 | Zheng et al. |
| 2012/0274814 | A1 | 11/2012 | Wajs |
| 2013/0070965 | A1* | 3/2013 | Jang et al. ..................... 382/103 |
| 2013/0129201 | A1 | 5/2013 | Liu et al. |
| 2013/0223760 | A1 | 8/2013 | Jiang et al. |
| 2013/0272495 | A1* | 10/2013 | Bullard et al. .................. 378/37 |

FOREIGN PATENT DOCUMENTS

| | | |
|---|---|---|
| WO | 2012173571 A1 | 12/2012 |
| WO | 2013014083 A1 | 1/2013 |
| WO | 2013109192 A1 | 7/2013 |

OTHER PUBLICATIONS

Wang, Z., et al., "Medical image fusion using m-PCNN," Information Fusion, 2008, pp. 176-185, vol. 9, No. 2, Elsevier B. V.

Waxman, A. M., et al., "Solid-State Color Night Vision: Fusion of Low-Light Visible and Thermal Infrared Imagery," Lincoln Laboratory Journal, 1998, pp. 41-60, vol. 11, No. 1.

Wong, T. Z., et al., "PET and Brain Tumor Image Fusion," Cancer Journal, 2004, pp. 234-242, vol. 10, No. 4.

Xue, Z., et al., "Concealed Weapon Detection Using Color Image Fusion," in ICIF '03: Proceedings of the 6th International Conference on Information Fusion, 2003, pp. 622-627, vol. 1, ISIF.

Yang, J., et al., "Image Fusion Using the Expectation-Maximization Algorithm and a Hidden Markov Model," in VTC '04: Proceedings of the 60th IEEE Vehicular Technology Conference, Sep. 2004, pp. 4563-4567, vol. 6, IEEE.

Yang, J., et al., "A Statistical Signal Processing Approach to Image Fusion Using Hidden Markov Models," Chapter 8 in Multi-Sensor Image Fusion and Its Applications, 2006, pp. 265-287, CRC Press, Boca Raton FL.

Yang, Y., et al., "Medical Image Fusion via an Effective Wavelet-Based Approach," Be Research Article EURASIP Journal on Advances in Signal Processing, 2010, pp. 1-13, vol. 2010, Article ID: 579341.

Zhang, W. et al., "Gradient-directed Composition of Multi-exposure Images," in CVPR '10: Proceedings of the 2010 IEEE Conference on Computer Vision and Pattern Recognition, 2010, pp. 530-536, IEEE.

Zhang, W. et al., "Gradient-Directed Multiexposure Composition," IEEE Transactions on Image Processing, Apr. 2012, pp. 2318-2323, vol. 21, No. 4, IEEE.

Zhang, Z., et al., "Region-Based Image Fusion Scheme for Concealed Weapon Detection," in Proceedings of the 31st Annual Conference on Information Sciences and Systems, 1997, pp. 168-173.

Zhao, H., et al., "Multi-focus color image fusion in the HSI space using the sum-modified-laplacian and a coarse edge map," Image and Vision Computing, 2008, pp. 1285-1295, vol. 26, No. 9, Elsevier B.V.

Zheng, S., et al., "Multisource Image Fusion Method Using Support Value Transform," IEEE Transactions on Image Processing, Jul. 2007, pp. 1831-1839, vol. 16, No. 7, IEEE.

Agarwala, A., et al., "Interactive Digital Photomontage," in SIGGRAPH '04: Proceedings of the 31th International Conference on Computer Graphics and Interactive Techniques, 2004, pp. 294-302.

Aggarwala, M., et al., "High dynamic range panoramic imaging," in ICCV '01: Proceedings of the 8th IEEE International Conference on Computer Vision, 2001, pp. 2-9, vol. 1.

Agrawal, A., et al., "Removing Photography Artifacts using Gradient Projection and Flash-Exposure Sampling," in SIGGRAPH '05: Proceedings of the 32th International Conference on Computer Graphics and Interactive Techniques, 2005, pp. 828-835.

Aguilar, M., et al., "Real-time fusion of low-light CCD and uncooled IR imagery for color night vision," in Proceedings of SPIE, 1998, pp. 124-135, vol. 3364.

Aguilar, M., et al., "Fusion of Multi-Modality Volumetric Medical Imagery," in ICIF '02: Proceedings of the 5th International Conference on Information Fusion, 2002, pp. 1206-1212, vol. 2.

Blum, R. et al., "An Overview of Image Fusion," Chapter 1 in Multi-Sensor Image Fusion and Its Applications, 2006, pp. 1-35, CRC Press, Boca Raton, FL.

Bogoni, L., et al., "Pattern-selective color image fusion," Pattern Recognition, 2001, pp. 1515-1526, vol. 34, No. 8., Elsevier Science Ltd.

Burt, P. J., "The Pyramid as a Structure for Efficient Computation," Chapter 2 in Multiresolution Image Processing and Analysis, 1984, pp. 6-35, New York: Springer-Verlag.

Burt, P. J., et al., "The Laplacian Pyramid as a Compact Image Code," IEEE Transactions on Communications, Apr. 1983, pp. 532-540, vol. 31, No. 4.

Burt, P. J., et al., "Enhanced Image Capture Through Fusion," in ICCV '93: Proceedings of the 4th IEEE International Conference on Computer Vision, 1993, pp. 173-182, IEEE.

Cheng, I., et al., "Contrast Enhancement from Multiple Panoramic Images," in OMNIVIS '07: Proceedings of ICCV Workshop on Omnidirectional Vision, Camera Networks and Non-classical Cameras, 2007, pp. 1-7, IEEE.

Cho, W. H., et al., "Extending Dynamic Range of Two Color Images under Different Exposures," in ICPR '04: Proceedings of the 17th International Conference on Pattern Recognition, 2004, pp. 853-856, vol. 4.

Debevec, P. E., et al., "Recovering High Dynamic Range Radiance Maps from Photographs," in SIGGRAPH '97: Proceedings of the 24th International Conference on Computer Graphics and Interactive Techniques, 1997, pp. 369-378.

Garcia-Perez, M. A., et al., "The transducer model for contrast detection and discrimination: formal relations, implications, and an empirical test," Spatial Vision, 2007, pp. 5-43, vol. 20, Nos. 1-2, VSP.

Giesel, F. L., et al., "Image Fusion Using CT, MRI, and PET for Treatment Planning, Navigation, and Follow Up in Percutaneous RFA," 2009, pp. 106-114, vol. 31, No. 2, Experimental Oncology.

Goshtasby, A., "Fusion of multi-exposure images," Image and Vision Computing, 2005, pp. 611-618, vol. 23, No. 6, Elsevier B.V.

Grady, L., "A Lattice-Preserving Multigrid Method for Solving the Inhomogeneous Poisson Equations Used in Image Analysis," in ECCV '08: Proceedings of the 10th European Conference on Computer Vision, 2008, pp. 252-264, Part II LNCS 5303.

Grady, L., et al., "A Geometric Multigrid Approach to Solving 2D Inhomogenous Laplace Equation With Internal Dirichlet Boundary Conditions," in ICIP '05: Proceedings of the 2005 IEEE International Conference on Image Processing, 2005, pp. 642-645, vol. 2, IEE.

Krawczyk, G., et al., "Lightness Perception in Tone Reproduction for High Dynamic Range Images," Computer Graphics Forum, 2005, pp. 635-645, vol. 24, No. 3.

(56) References Cited

OTHER PUBLICATIONS

Kuang, J., et al., "iCAM06: A refined image appearance model for HDR image rendering," Journal of Visual Communication and Image Representation, vol. 18, No. 5, pp. 406-414, 2007.
Kumar, M., et al., "A Total Variation-Based Algorithm for Pixel-Level Image Fusion," IEEE Transactions on Image Processing, 2009, pp. 2137-2143, vol. 18, No. 9, IEEE.
Laliberte, F., et al., "Studies on Registration and Fusion of Retinal Images," Chapter 3 in Multi-Sensor Image Fusion and Its Applications, 2006, pp. 57-106, CRC Press, Boca Raton, FL.
Lewis, J. J., et al., "Pixel- and region-based image fusion with complex wavelets," Information Fusion, 2007, pp. 119-130, vol. 8, No. 2, Elsevier B.V.
Li, H., et al., "Multisensor Image Fusion Using the Wavelet Transform," Graphical Models and Image Processing, May 1995, pp. 235-245, vol. 57, No. 3.
Li, S., et al., "Fusing Images With Different Focuses Using Support Vector Machines," IEEE Transactions on Neural Networks, Nov. 2004, pp. 1555-1561, vol. 15, No. 6.
Li, S., et al., "Performance comparison of different multi-resolution transforms for image fusion," Information Fusion, 2011, pp. 74-84, vol. 12, No. 2, Elsevier B.V.
Li, Y., et al., "Compressing and Companding High Dynamic Range Images with Subband Architectures," in SIGGRAPH '05: Proceedings of the 32th International Conference on Computer Graphics and Interactive Techniques, 2005, pp. 836-844, ACM.
Lischinski, D., et al., "Interactive Local Adjustment of Tonal Values," in SIGGRAPH '06: Proceedings of the 33th International Conference and Exhibition on Computer Graphics and Interactive Techniques, 2006, pp. 646-653, ACM.
Loza, A., et al., "Non-Gaussian model-based fusion of noisy images in the wavelet domain," Computer Vision and Image Understanding, 2010 pp. 54-65, vol. 114, No. 1, Elsevier Inc.
Mertens, T., et al., "Exposure Fusion," in PG '07: Proceedings of the 15th Pacific Conference on Computer Graphics and Applications, 2007, pp. 382-390, IEEE.
Mertens, T., et al., "Exposure Fusion: A Simple and Practical Alternative to High Dynamic Range Photography," Computer Graphics Forum, 2009, pp. 161-171, vol. 28, No. 1.
Nayar, S. K., et al., "High Dynamic Range Imaging: Spatially Varying Pixel Exposures," in CVPR '00: Proceedings of the 2000 IEEE Conference on Computer Vision and Pattern Recognition, 2000, pp. 472-479, vol. 1, IEEE.
Pajares, G., et al., "A wavelet-based image fusion tutorial," Pattern Recognition, 2004, pp. 1855-1872, vol. 37, No. 9, Elsevier Ltd.
Petrovic, V. et al., "Cross Band Pixel Selection in Multi-Resolution Image Fusion," in Proceedings of SPIE, 1999, pp. 319-326, vol. 3719.
Petrovic, V. S., et al., "Gradient-Based Multiresolution Image Fusion," IEEE Transactions Image Processing, 2004, pp. 228-237, vol. 13, No. 2, IEEE.
Petschnigg, G., et al., "Digital Photography with Flash and No-Flash Image Pairs," in SIGGRAPH '04: Proceedings of the 31th International Conference on Computer Graphics and Interactive Techniques, 2004, pp. 664-672, ACM.
Piella, G., "A general framework for multiresolution image fusion: from pixels to regions," Information Fusion, 2003, pp. 259-280, vol. 4, No. 4, Elsevier B. V.
Piella, G., "Image Fusion for Enhanced Visualization: A Variational Approach," International Journal of Computer Vision, 2009, pp. 1-11, vol. 83, No. 1.
Porter, B. C., et al., "Three-Dimensional Registration and Fusion of Ultrasound and MRI Using Major Vessels as Fiducial Markers," IEEE Transactions on Medical Imaging, Apr. 2001, pp. 354-359, vol. 20, No. 4.
Raman, S., et al., "A Matte-less, Variational Approach to Automatic Scene Compositing," in ICCV '07: Proceedings of the 11th IEEE International Conference on Computer Vision, 2007, pp. 1-6, IEEE.
Raman, S., et al., "Bilateral Filter Based Compositing for Variable Exposure Photography," in Proceedings of Eurographics Short Papers, 2009, pp. 1-4.
Raskar, R., et al., "Image Fusion for Context Enhancement and Video Surrealism," in NPAR '04: Proceedings of the 3rd International Symposium on Non-photorealistic Animation and Rendering, 2004, pp. 85-152, ACM.
Reinhard, E., et al., "Photographic Tone Reproduction for Digital images," in SIGGRAPH '02: Proceedings of the 29th International Conference on Computer Graphics and Interactive Techniques, 2002, pp. 267-276, ACM Inc.
Shan, Q., et al., "Globally Optimized Linear Windowed Tone Mapping," IEEE Transactions on Visualization and Computer Graphics, Jul./Aug. 2010, pp. 663-675, vol. 16, No. 4, IEEE.
Shen, R., et al., "Generalized Random Walks for Fusion of Multi-Exposure Images," IEEE Transactions on Image Processing, Dec. 2011, pp. 3634-3646, vol. 20, No. 12, IEEE.
Smith, M. I., et al., "A Review of Image Fusion Technology in 2005," Invited Paper in Proceedings of SPIE, 2005, pp. 29-45, vol. 5782.
Šroubek, F., et al., "Fusion of Blurred Images," Chapter 14 in Multi-Sensor Image Fusion and Its Applications, 2006, pp. 405-430, CRC Press, Boca Raton, FL.
Toet, A., "Hierarchical Image Fusion," Machine Vision and Applications, 1990, pp. 1-11, vol. 3, No. 1.
Toet, A., "Fusion of Images from Different Electro-Optical Sensing Modalities for Surveillance and Navigation Tasks," in Multi-Sensor Image Fusion and Its Applications, 2005, pp. 237-264, CRC Press, Boca Raton, FL.
Valdes Hernandez, M. C., et al., "New multispectral MRI data fusion technique for white matter lesion segmentation: method and comparison with thresholding in FLAIR images," European Radiology, 2010, pp. 1684-1691, vol. 20, No. 7.

* cited by examiner

METHOD AND SYSTEM FOR FUSING MULTIPLE IMAGES

FIELD

The present disclosure relates to the field of image processing, and in particular to a method and system for combining information from a plurality of images to form a single image.

BACKGROUND

Image fusion has been found useful in many applications. A single recorded image from an image sensor may contain insufficient details of a scene due to the incompatibility between the image sensor's capture range and the characteristics of the scene. For example, because a natural scene can have a high dynamic range (HDR) that exceeds the dynamic range of an image sensor, a single recorded image is likely to exhibit under- or over-exposure in some regions, which leads to detail loss in those regions. Image fusion can solve such problems by combining local details from a plurality of images recorded by an image sensor under different settings of an imaging device, such as under different exposure settings, or from a plurality of images recorded by different image sensors, each of which captures some but not all characteristics of the scene.

One type of image fusion method known in the art is based on multi-scale decomposition (MSD). Two types of commonly used MSD schemes include pyramid transform, such as Laplacian pyramid transform, and wavelet transform, such as discrete wavelet transform. Images are decomposed into multi-scale representations (MSRs), each of which contain an approximation scale generated by low-pass filtering and one or more detail scales generated by high-pass or band-pass filtering. The fused image is reconstructed by inverse MSD from a combined MSR.

Another type of image fusion method known in the art computes local features at the original image scale, and then, by solving an optimization problem, generates the fused image or the fusion weights, which are to be used as weighting factors when the images are linearly combined. Another type of image fusion methods divides images into blocks and generates a fused image by optimizing one or more criteria within each block.

Another type of method that can achieve a similar effect, as image fusion methods do when fusing images taken under different exposure settings, is the two-phase procedure of HDR reconstruction and tone mapping. An HDR image is reconstructed from the input images, and then the dynamic range of this HDR image is compressed in the tone mapping phase. However, the above types of methods may impose high spatial computational cost and/or high temporal computational cost, or introduce artifacts into a fused image due to non-linear transformations of pixel values or due to operations performed only in small local regions.

Accordingly, what is needed is a method and system that effectively and efficiently combines useful information from images, especially in the case of fusing images taken under different exposure settings.

SUMMARY

A method of producing a fused image is provided, including the steps of: providing a plurality of source images; determining a local feature matrix for each of the source images, for a feature of each of the source images; determining a local weight matrix for each of the source images, using the local feature matrix associated with the source image; determining a global weight vector for each of the source images; determining a final weight matrix for each of the source images, using the local weight matrix and global weight vector associated with the source image; and using the final weight matrices for the source images to combine the source images into a fused image.

A plurality of scales may be included when determining the local feature matrix for each of the source images. A local contrast value may be determined for each of the source images, the local contrast value modulated by a sigmoid shaped function. Each local contrast value has a magnitude, and the magnitude may be used to determine the local feature matrix.

Color saturation may be used with the local contrast values. A plurality of scales may be included when determining the local weight matrix for each of the source images. A local similarity matrix may be constructed to store similarity values between adjacent image regions. A local similarity pyramid may be constructed for each local similarity matrix. A binary function or set function may be used to compute the local similarity pyramids.

One or more global features may be determined for at least one source image; the global feature may be transformed using a pre-defined function; and a global weight vector may be constructed for each source image using the transformed global feature.

The local weight matrix and the global weight vector for each source image may be combined using a predetermined combination function. The global feature may be an average luminance of all of the source images or an average luminance of each source image.

A system for fusing images is provided, including: a computing device having a processor and a memory; the memory configured to store a plurality of source images; means for fusing an image, having: means for determining a local feature matrix for each of the source images, for a feature of each of the source images; means for determining a local weight matrix for each of the source images, using the local feature matrix associated with the source image; means for determining a global weight vector for each of the source images; means for determining a final weight matrix for each of the source images, using the local weight matrix and global weight vector associated with the source image; and means for using the final weight matrices for the source images to combine the source images into a fused image.

An image source may provide the source images. The image source may be an image sensor. The means for fusing an image may be stored within processor executable instructions of the computing device. The means for fusing an image may be within a software module or a hardware module in communication with the processor.

DETAILED DESCRIPTION

Figure 1:
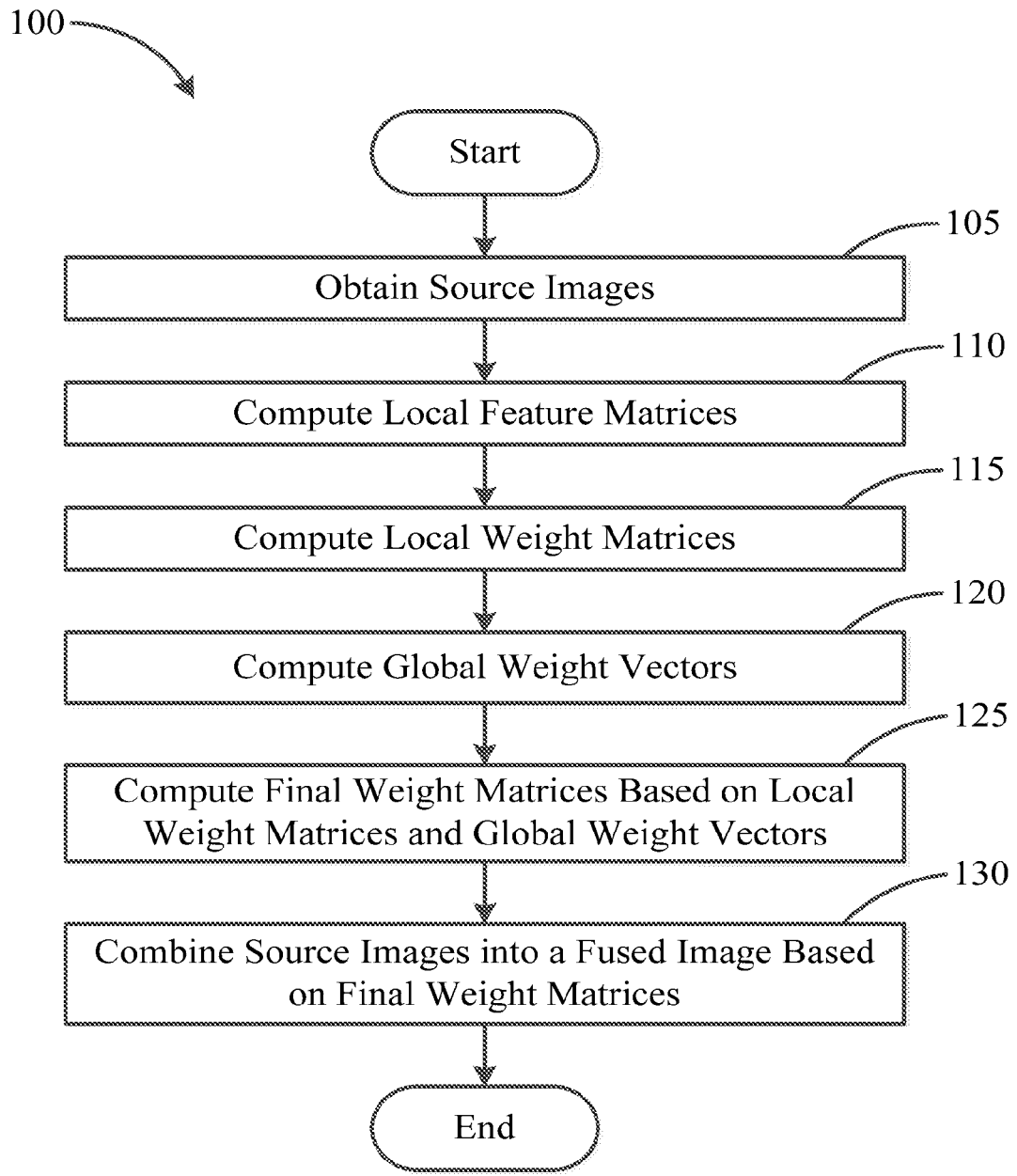
FIG. 1 is a flow chart illustrating a procedure of combining a plurality of images into a single fused image according to an aspect of the present disclosure.

FIG. 1 illustrates the procedure 100 of combining a plurality of source images into a single fused image. An "image" herein refers to a matrix of image elements. A matrix can be a one-dimensional (1D) matrix or a multi-dimensional matrix. Examples of an image element include but are not limited to a pixel in the 1D case, a pixel in the two-dimensional (2D) case, a voxel in the three-dimensional (3D) case, and a doxel, or dynamic voxel, in the four-dimensional (4D) case. A "source image" herein refers to an image to be inputted to an image fusion procedure. A "fused image" herein refers to an image that is the output of an image fusion procedure.

For the ease of exposition, the description hereafter generally directs to the case wherein source images are taken under different exposure settings, and the source images are 2D images. However, with no or minimal modifications, the method and system of the present disclosure can be applied in cases in which source images are taken under other settings or by different imaging devices, such as images taken under different focus settings, images taken by different medical imaging devices, and images taken by one or more multispectral imaging devices; or in cases in which source images are in dimensions other than 2D.

In step 105, a plurality of source images is obtained from one or more image sensors or from one or more image storage devices. The source images are of the same size; if not, they can be scaled to the same size. In step 110, for each source image, a local feature matrix is computed. A local feature herein represents a certain characteristic of an image region, such as the brightness in an image region or the color variation in an image region. An "image region" herein refers to a single image element or a group of image elements. Each element of a local feature matrix is a numerical value that represents a local feature. In step 115, for each source image, a local weight matrix is computed using the local feature matrices from step 110. A "weight matrix" herein refers to a matrix, in which each element is a numerical value that corresponds to an image region in a source image and determines the amount of contribution from that image region to a fused image. In step 120, for each source image, a global weight vector is computed. In step 125, for each source image, its local weight matrix and its global weight vector are combined to form a final weight matrix.

In step 130, the fused image is generated by combining the source images based on the final weight matrices. Such a combination can be performed as a weighted average of the source images using the final weight matrices as weighting factors. Let K denote the number of source images, where K≥2. Let $I_k$ denote the k th source image, where 0≤k≤K−1. Let $X_k$ denote the k th final weight matrix, which is of the same size as the source images. Let $\bar{I}$ denote the fused image. Let □ denote the operator of element-wise multiplication. Then, the weighted average for forming the fused image can be expressed using the following equation:

$$\bar{I} = \sum_{k=0}^{K-1} X_k \square I_k \quad (1)$$

If the value of an image element in the fused image exceeds a pre-defined dynamic range, it can be either scaled or truncated to meet that range.

Although in FIG. 1, step 120 is depicted to be performed after step 110 and step 115, it can be performed before step 115 or before step 110, or in parallel with step 110 or step 115 or with both.

Computing Local Feature Matrices

Figure 2:
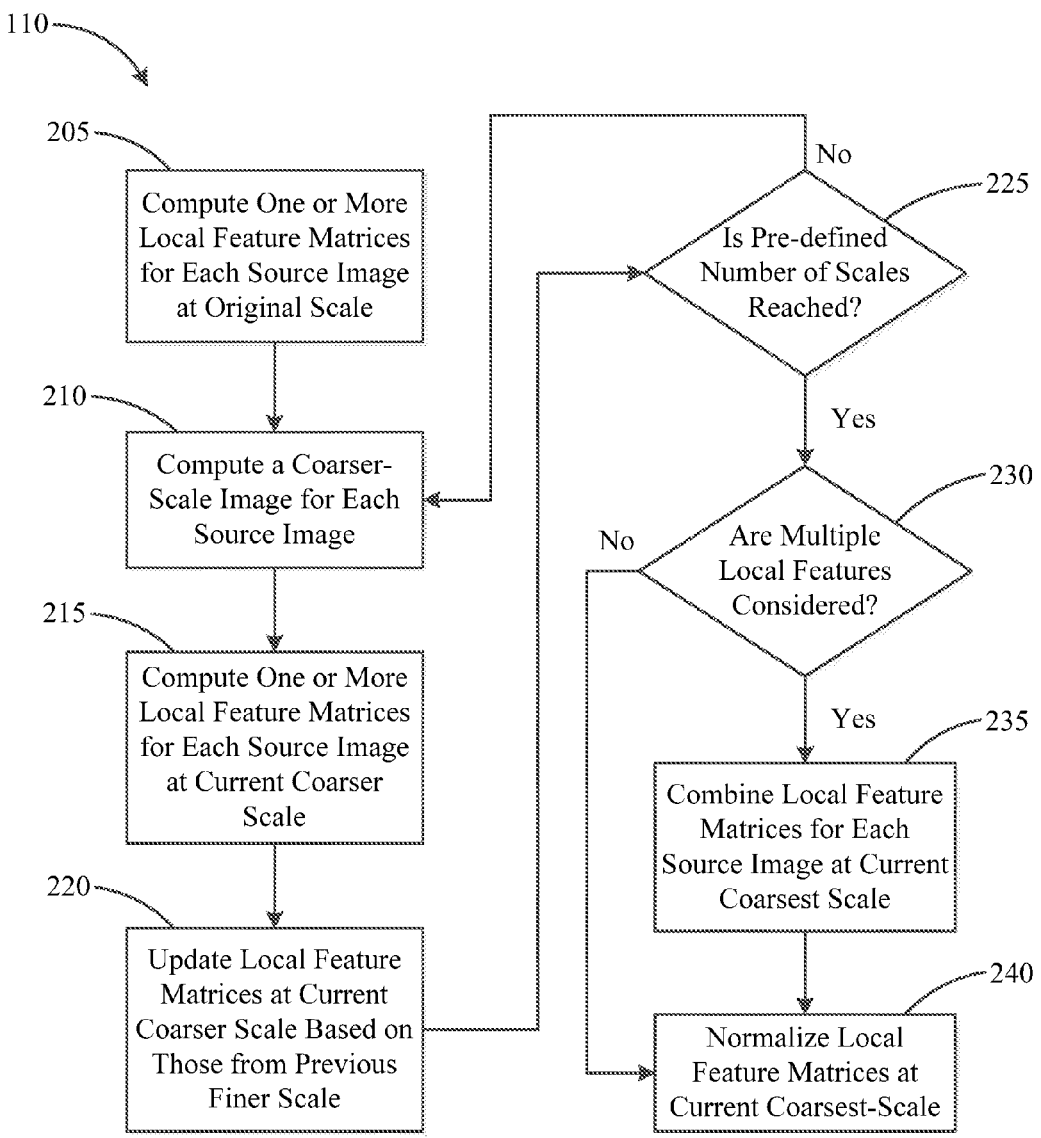
FIG. 2 is a flow chart illustrating the procedure of computing local feature matrices according to an aspect of the present disclosure.

FIG. 2 further illustrates step 110 of computing local feature matrices. One or more local features can be considered, depending on the characteristics of the source images and on the individual application scenarios. Examples of a local feature include but are not limited to local contrast in an image region, color saturation in an image region, hue in an image region, brightness/luminance in an image region, color contrast in an image region, average local contrast in an image region, average color saturation in an image region, average hue in an image region, average luminance in an image region, average color contrast in an image region, variation of local contrast in an image region, variation of color saturation in an image region, hue variation in an image region, luminance variation in an image region, variation of color contrast in an image region, and color variation in an image region. The local feature computation (step 110) is performed in a multi-scale fashion, which captures local features at different scales. In addition, because the total number of image elements in source images can be very large, local feature matrices computed in a multi-scale fashion also help to reduce the computational cost in subsequent processing. An alternative is to perform the local feature computation only at a single scale, but this excludes the benefit of using local features from different scales and may incur higher computational cost in subsequent processing.

The computation of local feature matrices is first performed for each source image at its original scale, with reference to step 205. When a single local feature is considered, there is only one local feature matrix computed for each source image in step 205. When multiple local features are considered, a local feature matrix is initially computed for each local feature in each source image in step 205. In step 210, a coarser-scale image is computed for each source image. In step 215, a single local feature matrix (in the case that one local feature is considered) or multiple local feature matrices (in the case that multiple local features are considered) are computed at the current coarser scale. In step 220, the current coarser-scale local feature matrix or matrices are updated using information from those at the previous finer scale. Steps 210, 215, and 220 are repeated until a pre-defined or pre-computed number of scales are reached in step 225. Step 230 checks whether multiple local features are considered. If multiple local features are considered, then, for each source image, its multiple local feature matrices at the current coarsest scale are combined into a single local feature matrix, as depicted in step 235. Finally, the local feature matrices at the current coarsest scale are normalized in step 240.

For example, in an aspect, step 110, the step of computing local feature matrices, can be performed as follows, considering a single local feature.

Local contrast is used as the single local feature, which is applicable to both color and grayscale source images. Local contrast represents the local luminance variation with respect to the surrounding luminance, and local details are normally associated with local variations. Therefore, taking local contrast in the luminance channel as a local feature helps to preserve local details. Alternatively, local luminance variation can be considered alone without taking into account the surrounding luminance. However, in this way, image regions with the same amount of local luminance variation are treated equally regardless of their surrounding luminance. Therefore, some image regions with high local contrast may not be effectively differentiated from other image regions with low local contrast, which may impair the quality of the fused image. Local contrast is normally defined as the ratio between the band-pass or high-pass filtered image and the low-pass filtered image. However, under such a definition, under-exposed image regions, which are normally noisy, may produce stronger responses than well-exposed image regions. This makes under-exposed image regions contribute more to the fused image and reduce the overall brightness. Thus, if the response from the low-pass filter in an image region is below a threshold θ, the response from the band-pass or high-pass filter in that image region, instead of the ratio, is taken as the local contrast value in order to suppress noise. This computation of local contrast values is performed for each source image at its original scale, with reference to step 205.

For a grayscale image, its intensities or luminance values are normalized to the range [0,1], and then the computation of local contrast values is directly performed on the normalized luminance values. For a color image, a grayscale or luminance image can be extracted, and then the computation of local contrast values is performed on this extracted grayscale image. There are various known methods to extract the luminance image from a color image, such as converting the color image to the LHS (luminance, hue, saturation) color space and then taking the "L" components.

Let $C_k^0$ denote the matrix of local contrast values computed for the k th source image $I_k$ at its original scale, i.e., the 0th scale. Let $[M]_{ind}$ denote an element of a matrix M, where the location of this element in the matrix M is indicated by an index vector ind. For example, in the 2D case, ind can be expressed as ind=(i,j), and then $[M]_{i,j}$ represents the element in the i th row and j th column in matrix M. Let ψ denote a band-pass or high-pass filter, such as Laplacian filter. Let φ denote a low-pass filter, such as Gaussian filter. Let $\otimes$ denote the operator of convolution. Then, the computation of local contrast values in step 205 can be expressed as the following equation:

$$[C_k^0]_{ind} = \begin{cases} [\psi \otimes I_k]_{ind}, & \text{if}[\phi \otimes I_k]_{ind} < \theta; \\ [\psi \otimes I_k]_{ind}/[\phi \otimes I_k]_{ind}, & \text{otherwise.} \end{cases} \quad (2)$$

The response of a band-pass filter can be approximated by the difference between the original image and the response of a low-pass filter. Therefore, the computation of local contrast values in step 205 can also be expressed as:

$$[C_k^0]_{ind} = \begin{cases} [I_k]_{ind} - [\phi \otimes I_k]_{ind}, & \text{if}[\phi \otimes I_k]_{ind} < \theta; \\ ([I_k]_{ind} - [\phi \otimes I_k]_{ind})/[\phi \otimes I_k]_{ind}, & \text{otherwise.} \end{cases} \quad (3)$$

The matrix of the magnitudes of the local contrast values, denoted by $\tilde{C}_k^0$, can be taken as one local feature matrix at the original scale.

In step 210, a coarser-scale image of each source image is computed by down sampling the image by a pre-defined factor f in each dimension. Normally, f is taken to be two (2) or a power of two (2). For example, when f=2, the down sampling can be performed as filtering the image with a low-pass filter and then selecting every other element in each dimension or as directly selecting every other element in each dimension. Let $N_c$ denote the pre-defined number of scales used in computing local feature matrices, where $N_c \geq 2$. Let $G_k^n$ denote the n th scale of the k th source image, where $0 \leq n \leq N_c-1$. Let $[M]^{\downarrow f}$ denote the operator of down sampling a matrix M by a factor f in each dimension. Then, computing a coarser scale of each source image can be expressed by the following equation:

$$G_k^n = \begin{cases} I_k, & n = 0; \\ [G_k^{n-1}]^{\downarrow f} & 1 \leq n \leq N_c - 1. \end{cases} \quad (4)$$

In step 215, the same local feature computation performed in step 205 is performed, except that now the computation is performed at a coarser scale of each source image. Let $C_k^n$ denote the matrix of local contrast values computed for the k th source image $I_k$ at its n th scale. Then, $C_k^n$ can be computed using the following equation:

$$[C_k^n]_{ind} = \begin{cases} [\psi \otimes G_k^n]_{ind}, & \text{if}[\phi \otimes G_k^n]_{ind} < \theta; \\ [\psi \otimes G_k^n]_{ind}/[\phi \otimes G_k^n]_{ind}, & \text{otherwise.} \end{cases} \quad (5)$$

The response of a band-pass filter can be approximated by the difference between the original image and the response of a low-pass filter. Therefore, the computation of local contrast values in step 215 can also be expressed as:

$$[C_k^n]_{ind} = \begin{cases} [G_k^n]_{ind} - [\phi \otimes G_k^n]_{ind}, & \text{if}[\phi \otimes G_k^n]_{ind} < \theta; \\ ([G_k^n]_{ind} - [\phi \otimes G_k^n]_{ind})/[\phi \otimes G_k^n]_{ind}, & \text{otherwise.} \end{cases} \quad (6)$$

The matrix of the magnitudes of the local contrast values at the n th scale, denoted by $\tilde{C}_k^n$, can be taken as one local feature matrix at the n th scale, where $0 \leq n \leq N_c-1$.

In steps 205 and 215, an alternative to directly taking the matrix $\tilde{C}_k^n$ of the magnitudes of the local contrast values as a local feature matrix at the n th scale is taking a modulated version of $\tilde{C}_k^n$, in order to further suppress noise in image regions with high luminance variations. This modulation can be performed by applying a sigmoid shaped function to $\tilde{C}_k^n$. One such sigmoid shaped function is the logistic psychometric function (proposed in García-Pérez and Alcalá-Quintana 2007, "The Transducer Model For Contrast Detection And Discrimination: Formal Relations, Implications, and an Empirical Test", *Spatial Vision*, vol. 20, nos. 1-2, pp. 5-43, 2007) in which case $\tilde{C}_k^n$ is modulated by the following equation:

$$[\tilde{C}_k^n]_{ind} = 0.5 + \frac{0.5}{1 + \exp(-(\log([\tilde{C}_k^n]_{ind}) + 1.5)/0.11)} \quad (7)$$

where exp (•) is an exponential function and log (•) is a logarithmic function.

In order to obtain the best representative information from finer scales, $\tilde{C}_k^n$ is updated using the information from $\tilde{C}_k^{n-1}$ for any n>1, as depicted in step 220. This information update can be performed using a set function. A "set function" herein refers to a function, the input of which is a set of variables. When the input set to the set function has two elements, a binary function can be used. A "binary function" herein refers to a set function, the input of which is an ordered pair of variables. Let $\hat{C}_k^n$ denote the updated matrix of the magnitudes of the local contrast values at the n th scale $\hat{C}_k^n$ can be taken as one local feature matrix at the n th scale, where $0 \le n \le N_c - 1$. Let func $(\bullet, \bullet)$ denote a set function. Then, $\hat{C}_k^n$ can be expressed using the following equation:

$$[\hat{C}_k^n]_{ind} = \begin{cases} [\tilde{C}_k^n]_{ind}, & n = 0; \\ func([\tilde{C}_k^n]_{ind}, [[\tilde{C}_k^{n-1}]^{\downarrow f}]_{ind}), & 1 \le n \le N_c - 1. \end{cases} \quad (8)$$

For example, func$(\bullet, \bullet)$ can be a maximum function, which is to choose the maximum from two input values. Then, $\hat{C}_k^n$ can be expressed using the following equation:

$$[\hat{C}_k^n]_{ind} = \begin{cases} [\tilde{C}_k^n]_{ind}, & n = 0; \\ \max([\tilde{C}_k^n]_{ind}, [[\tilde{C}_k^{n-1}]^{\downarrow f}]_{ind}), & 1 \le n \le N_c - 1. \end{cases} \quad (9)$$

Steps 210, 215, and 220 are repeated until $N_c$, a pre-defined number of scales, is reached (step 225). Because a single local feature is considered, after step 230, step 240 is performed. The normalization is an element-wise normalization across all local feature matrices at the current coarsest scale. Let $Y_k^n$ denote the normalized local feature matrix associated with the n th scale of the k th source image. Then, $Y_k^{N_c-1}$ denotes the output from step 240 for the k th source image. The computation of $Y_k^{N_c-1}$ can be expressed using the following equation:

$$[Y_k^{N_c-1}]_{ind} = \frac{[\hat{C}_k^{N_c-1}]_{ind}}{\sum_{m=0}^{K-1} [\hat{C}_m^{N_c-1}]_{ind}} \quad (10)$$

As another example, in an alternative embodiment, step 110, the step of computing local feature matrices, can be performed as follows, considering two local features.

For color source images, two local features can be considered: local contrast and color saturation. Since local contrast only works in the luminance channel, using local contrast alone may not produce satisfactory results for color images in some cases, for example where high local contrast is achieved at the cost of low colorfulness or color saturation. Objects captured at proper exposures normally exhibit more saturated colors. Therefore, color saturation can be used as another local feature complementary to local contrast for color source images.

The computation of local contrast values in steps 205, 210, 215, 220, and 225 is the same as that described in the previous embodiment, where a single local feature is considered in step 110 of computing local feature matrices. The computation of color saturation values in steps 205, 210, 215, 220, and 225 and the computation in steps 230, 235, and 240 are described below.

Let $S_k^n$ denote the matrix of color saturation values computed for the k th source image $I_k$ at the n th scale. Let $Rd_k^n$, $Gr_k^n$, and $Bl_k^n$ denote the red channel, the green channel, and the blue channel of the k th source image $I_k$ at the n th scale, respectively. Then, in steps 205 and 215, $S_k^n$ can be computed for each source image following the color saturation definition in the LHS color space, as expressed in the following equation:

$$[S_k^n]_{ind} = 1 - \frac{\min([Rd_k^n]_{ind}, [Gr_k^n]_{ind}, [Bl_k^n]_{ind})}{([Rd_k^n]_{ind} + [Gr_k^n]_{ind} + [Bl_k^n]_{ind})/3} \quad (11)$$

Other alternatives include but are not limited to the definition of color saturation in the HSV (hue, saturation, value) color space and the definition of color saturation in the CIELAB (International Commission on Illumination 1976 L*a*b*) color space.

In step 210, a coarser-scale image of each source image is computed in the same way as described in the previous embodiment. Steps 210, 215, and 220 are repeated until $N_c$, a pre-defined number of scales, is reached in step 225. Because two local features are considered, after step 230, step 235 is performed. The two local feature matrices for each source image at the coarsest scale are combined using a binary function comb $(\bullet, \bullet)$. For example, comb $(\bullet, \bullet)$ can be the multiplication function. Let $Cf_k^{N_c-1}$ denote the combined local feature matrix for the k th source image at the $(N_c-1)$ th scale. Then, $Cf_k^{N_c-1}$ can be computed using the following equation:

$$[Cf_k^{N_c-1}]_{ind} = comb([\hat{C}_k^{N_c-1}]_{ind}, [S_k^{N_c-1}]_{ind}) = [\hat{C}_k^{N_c-1}]_{ind} [S_k^{N_c-1}]_{ind} \quad (12)$$

In step 240, element-wise normalization is performed on the combined local feature matrices. The normalized local feature matrix $Y_k^{N_c-1}$ associated with the $(N_c-1)$th scale of the k th source image can be computed using the following equation:

$$[Y_k^{N_c-1}]_{ind} = \frac{[Cf_k^{N_c-1}]_{ind}}{\sum_{m=0}^{K-1} [Cf_m^{N_c-1}]_{ind}} \quad (13)$$

Computing Local Weight Matrices

Figure 3:
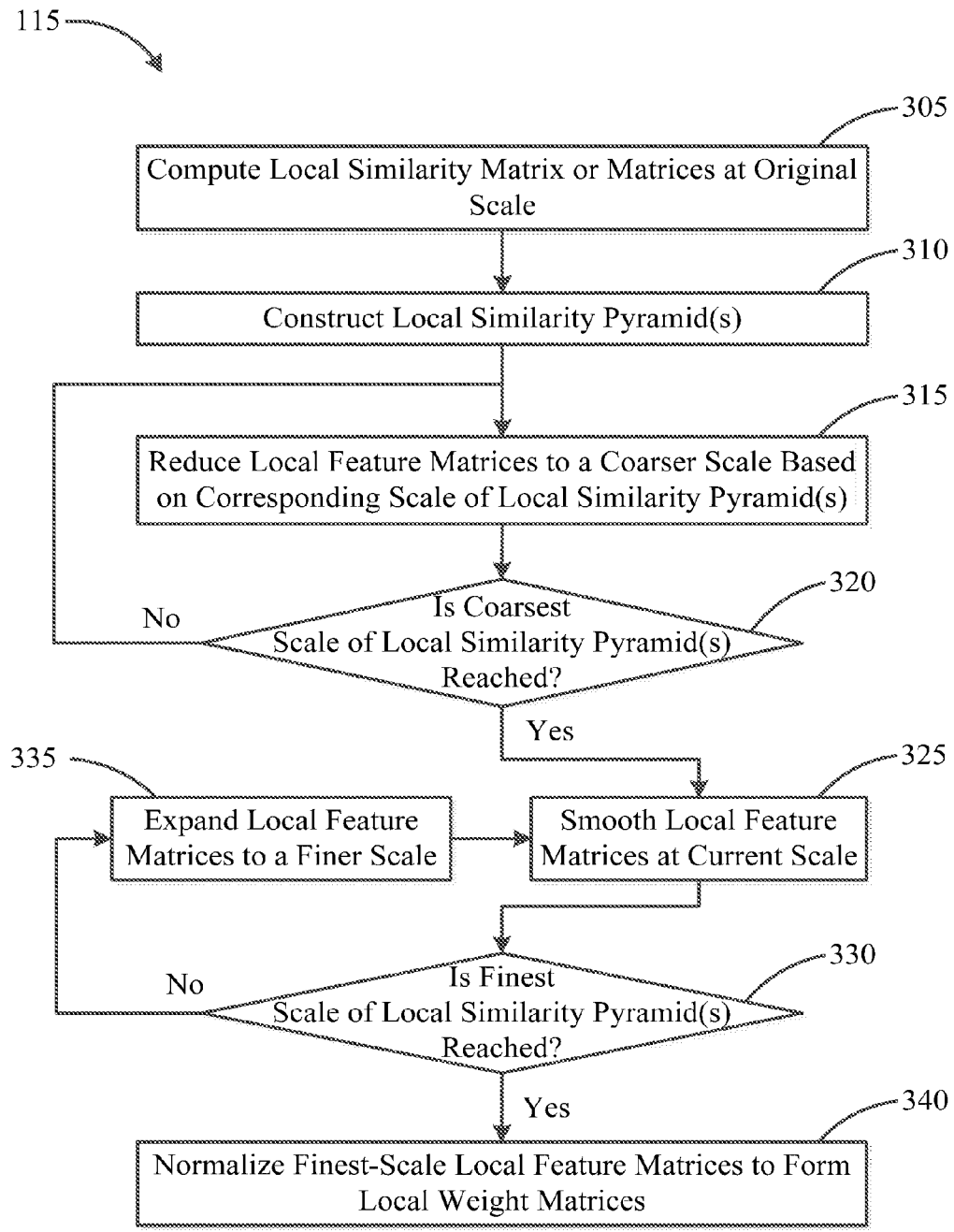
FIG. 3 is a flow chart illustrating the procedure of computing local weight matrices according to an aspect of the present disclosure.

FIG. 3 further illustrates step 115 of computing local weight matrices. The computation is performed in a hierarchical manner in order to achieve higher computational speed with lower memory usage. An alternative is to perform the computation only at a single scale without the hierarchy, but this may incur higher computational cost. In step 305, one or more local similarity matrices are computed at the original scale (i.e., the 0th scale). Each element in a local similarity matrix is a similarity value, which represents the degree of similarity between adjacent image regions in the source images.

In step 310, for each local similarity matrix computed from step 305, a local similarity pyramid is constructed. The local similarity matrix at a coarser scale of a local similarity pyramid is computed by reducing its previous finer scale. Although standard down sampling schemes can be used, a reduction scheme that respects boundaries between dissimilar image regions in the source images is preferred, as will be described below. The local similarity pyramids have the same height (i.e., number of scales), which can be pre-defined or pre-computed. The height of local similarity pyramids, denoted by $N_s$, is larger than $N_c$, the pre-defined number of scales used in step 110 of computing local feature matrices. A local similarity matrix at the n th scale of a local similarity pyramid corresponds to the local feature matrices at the n th scale, where $0 \le n \le N_c - 1$.

In step 315, the local feature matrices at scale $N_c - 1$ from step 110 are further reduced to a coarser scale taking into account the local similarity matrix or matrices. In step 315, a local feature matrix at the current scale is first updated based on the local similarity matrix or matrices at the same scale and is then reduced in spatial resolution. Although standard down sampling schemes can be used, the purpose of using local similarity matrix or matrices in step 315 is to respect boundaries between dissimilar image regions in the source images. An element in a coarser-scale local feature matrix can be computed as a weighted average of its corresponding matrix elements in the finer-scale local feature matrix. The weighting factors used in such weighted average can be determined based on the local similarity matrix or matrices at the finer scale. Step 315 is repeated until scale $N_s-1$, the coarsest scale of local similarity pyramids, is reached (step 320).

In step 325, the local feature matrices at the current scale are smoothed. Smoothed local feature matrices help to remove unnatural seams in the fused image. For example, the smoothing can be performed by applying one or more of the following schemes: a low-pass filter, such as Gaussian filter, a relaxation scheme, such as Gauss-Seidel relaxation, or an edge-preserving filter, such as bilateral filter. A smoothing scheme that uses local similarity matrix or matrices may be used, for the same reason as mentioned above for step 315, which is to respect boundaries between dissimilar image regions in the source images. At each scale, a smoothing scheme can be applied zero, one, or more times. Step 330 checks whether the finest scale of the local similarity pyramids (i.e., the 0th scale) is reached. If the 0th scale is not reached, step 335 is performed; otherwise, step 340 is performed.

In step 335, the local feature matrices at the current scale are expanded to a finer scale, and this finer scale becomes the current scale for subsequent processing. A standard up sampling scheme can be used for this expansion operation, which is to perform interpolation between adjacent matrix elements. In addition, a scheme that employs local similarity matrix or matrices can be used, in order to respect boundaries between dissimilar image regions in the source images. An element in a finer-scale local feature matrix can be computed as a weighted average of its corresponding matrix elements in the coarser-scale local feature matrix. The weighting factors used in such weighted average can be determined based on the local similarity matrix or matrices at the finer scale. Steps 325 and 335 are repeated until the 0th scale is reached (step 330). In step 340, the finest-scale local feature matrices are normalized to form the local weight matrices.

For example, in an aspect, step 115, the step of computing local weight matrices, can be performed as follows.

In step 305, each local similarity matrix captures local similarities along one direction. One or more similarity matrices can be used. For d-dimensional images, any direction in the d-dimensional space can be considered, such as the horizontal direction, the vertical direction, and the diagonal directions. Let $W_d^n$ denote the similarity matrix for the direction d at the n th scale. Let $[M]_{ind}^{\to d}$ denote the matrix element that is closest to the matrix element $[M]_{ind}$ in the direction d. Then, $W_d^0$ can be computed using the following equation:

$$[W_d^0]_{ind} = \prod_{k=0}^{K-1} \exp\left(-\frac{dist([I_k]_{ind}, [I_k]_{ind}^{\to d})}{\sigma}\right) \tag{14}$$

where dist(•,•) denotes a binary function that computes the distance of two input entities, and $\sigma$ is a free parameter. For example, dist(•,•) can be the function of computing Euclidean distance, the function of computing Manhattan distance, or the function of computing Mahalanobis distance. $W_d^0$ can be computed based on all source images, as expressed in Equation 14, or it can be computed based on some of the source images.

For the 2D case, two local similarity matrices that capture local similarities along two directions can be considered: a horizontal similarity matrix that stores the similarity values between adjacent image regions along the horizontal direction, and a vertical similarity matrix that stores the similarity values between adjacent image regions along the vertical direction. Let $W_h^n$ denote the horizontal similarity matrix at the n th scale. Then, $W_h^0$ can be computed using the following equation:

$$[W_h^0]_{i,j} = \prod_{k=0}^{K-1} \exp\left(-\frac{dist([I_k]_{i,j}, [I_k]_{i,j+1})}{\sigma}\right) \tag{15}$$

Let $W_v^n$ denote the vertical similarity matrix at the n th scale. Then, $W_v^0$ can be computed using the following equation:

$$[W_v^0]_{i,j} = \prod_{k=0}^{K-1} \exp\left(-\frac{dist([I_k]_{i,j} - [I_k]_{i+1,j})}{\sigma}\right) \tag{16}$$

The horizontal and vertical similarity matrices can be computed based on all source images, as expressed in Equation 15 and Equation 16, or they can be computed based on some of the source images.

In step 310, for each local similarity matrix computed from step 305, a local similarity pyramid is constructed. A coarser-scale similarity matrix can be computed using a set function. When the input set to the set function has two elements, a binary function can be used. One such binary function can be the minimum function, and then, the reduction scheme for reducing local similarity matrices at the n th scale, where $0 \leq n \leq N_s-2$, can be expressed in the following equations:

$$[W_d^{n+1}]_{ind} = \min([W_d^n]_{2*ind}, [W_d^n]_{2*ind}^{\to d}) \tag{17}$$

where * denotes the operator of multiplication.

For the 2D case, the horizontal similarity matrix at a coarser scale of the horizontal similarity pyramid and the vertical similarity matrix at a coarser scale of the vertical similarity pyramid can be computed using a binary function. One such binary function can be the minimum function, and then, the reduction scheme for reducing local similarity matrices at the n th scale, where $0 \leq n \leq N_s-2$, can be expressed in the following equations:

$$[W_h^{n+1}]_{i,j} = \min([W_h^n]_{2i,2j}, [W_h^n]_{2i,2j+1}) \tag{18}$$

$$[W_v^{n+1}]_{i,j} = \min([W_v^n]_{2i,2j}, [W_v^n]_{2i+1,2j}) \tag{19}$$

In step 315, the local feature matrices at scale $N_c-1$ from step 110 are further reduced to a coarser scale taking into account the local similarity matrices. Rather than the previously described reduction schemes, a modified version of the restriction operator of the multi-grid linear system solver (as in Grady et al., "A Geometric Multi-Grid Approach to Solving the 2D Inhomogeneous Laplace Equation With Internal Dirichlet Boundary Conditions", *IEEE International Conference on Image Processing*, vol. 2, pp. 642-645, 2005) can be used as the reduction scheme for the local feature matrices. This reduction scheme for reducing a local feature matrix $Y_k^n$ at the n th scale, where $N_c-1 \leq n \leq N_s-2$, can be expressed in the following three equations for the 2D case:

$$[Y_k^n]_{2i,2j+1} = [Y_k^n]_{2i,2j+1} + \frac{[W_h^n]_{2i,2j}[Y_k^n]_{2i,2j} + [W_h^n]_{2i,2j+1}[Y_k^n]_{2i,2j+2}}{[W_h^n]_{2i,2j} + [W_h^n]_{2i,2j+1}} \quad (20)$$

$$[Y_k^n]_{2i+1,2j} = [Y_k^n]_{2i,2j} + \frac{[W_v^n]_{2i,2j}[Y_k^n]_{2i,2j} + [W_v^n]_{2i+1,2j}[Y_k^n]_{2i+2,2j}}{[W_v^n]_{2i,2j} + [W_v^n]_{2i+1,2j}} \quad (21)$$

$$[Y_k^{n+1}]_{i,j} = \quad (22)$$
$$[Y_k^n]_{2i+1,2j+1} + \frac{[W_h^n]_{2i+1,2j}[Y_k^n]_{2i+1,2j} + [W_h^n]_{2i+1,2j+1}[Y_k^n]_{2i+1,2j+2}}{[W_h^n]_{2i+1,2j}[W_h^n]_{2i+1,2j+1} + [W_v^n]_{2i+1,2j+1}[W_v^n]_{2i+1,2j+1}} +$$
$$\frac{[W_v^n]_{2i,2j+1}[Y_k^n]_{2i,2j+1} + [W_v^n]_{2i+1,2j+1}[Y_k^n]_{2i+2,2j+1}}{[W_h^n]_{2i+1,2j}[W_h^n]_{2i+1,2j+1} + [W_v^n]_{2i,2j+1}[W_v^n]_{2i+1,2j+1}}$$

Padding to $W_h^n$, $W_v^n$, and $Y_k^n$ can be added, when a matrix index is out of range. Step 315 is repeated until scale $N_s-1$ is reached (step 320).

In step 325, the local feature matrices at the n th scale can be smoothed based on the local similarity matrices at that scale using the following equation for the 2D case:

$$[Y_k^n]_{i,j} = \frac{[Y_k^n]_{i,j}}{[W_h^n]_{i,j-1} + [W_h^n]_{i,j} + [W_v^n]_{i-1,j} + [W_v^n]_{i,j}} + \quad (23)$$
$$\gamma \frac{[W_h^n]_{i,j-1}[Y_k^n]_{i,j-1} + [W_h^n]_{i,j}[Y_k^n]_{i,j+1}}{[W_h^n]_{i,j-1} + [W_h^n]_{i,j} + [W_v^n]_{i-1,j} + [W_v^n]_{i,j}} +$$
$$\gamma \frac{[W_v^n]_{i-1,j}[Y_k^n]_{i-1,j} + [W_v^n]_{i,j}[Y_k^n]_{i+1,j}}{[W_h^n]_{i,j-1} + [W_h^n]_{i,j} + [W_v^n]_{i-1,j} + [W_v^n]_{i,j}}$$

where $\gamma$ is a free parameter.

Step 330 checks whether the finest scale of the local similarity pyramids (i.e., the 0th scale) is reached. If the 0th scale is not reached, step 335 is performed; otherwise, step 340 is performed. In step 335, the local feature matrices at the n th scale are expanded to a finer scale. Rather than the previously described expansion schemes, a modified version of the prolongation operator of the multi-grid linear system solver can be used as an expansion scheme for the local feature matrices. This expansion scheme for expanding a local feature matrix $Y_k^n$ at the n th scale, where $1 \leq n \leq N_s-1$, can be expressed in the following four equations for the 2D case:

$$[Y_k^{n-1}]_{2i+1,2j+1} = [Y_k^n]_{i,j} \quad (24)$$

$$[Y_k^{n-1}]_{2i+1,2j} = \frac{[W_h^{n-1}]_{2i+1,2j-1}[Y_k^{n-1}]_{2i+1,2j-1} + [W_h^{n-1}]_{2i+1,2j}[Y_k^{n-1}]_{2i+1,2j+1}}{[W_h^{n-1}]_{2i+1,2j-1} + [W_h^{n-1}]_{2i+1,2j}} \quad (25)$$

$$[Y_k^{n-1}]_{2i,2j+1} = \quad (26)$$
$$\frac{[W_v^{n-1}]_{2i-1,2j+1}[Y_k^{n-1}]_{2i-1,2j+1} + [W_v^{n-1}]_{2i,2j+1}[Y_k^{n-1}]_{2i+1,2j+1}}{[W_v^{n-1}]_{2i-1,2j+1} + [W_v^{n-1}]_{2i,2j+1}}$$

$$[Y_k^{n-1}]_{2i,2j} = \frac{[W_h^{n-1}]_{2i,2j-1}[Y_k^{n-1}]_{2i,2j-1} + [W_h^{n-1}]_{2i,2j}[Y_k^{n-1}]_{2i,2j+1}}{[W_h^{n-1}]_{2i,2j-1} + [W_h^{n-1}]_{2i,2j} + [W_v^{n-1}]_{2i-1,2j} + [W_v^{n-1}]_{2i,2j}} + \quad (27)$$
$$\frac{[W_v^{n-1}]_{2i-1,2j}[Y_k^{n-1}]_{2i-1,2j} + [W_v^{n-1}]_{2i,2j}[Y_k^{n-1}]_{2i+1,2j}}{[W_h^{n-1}]_{2i,2j-1} + [W_h^{n-1}]_{2i,2j} + [W_v^{n-1}]_{2i-1,2j} + [W_v^{n-1}]_{2i,2j}}$$

Padding to $W_h^{n-1}$, $W_v^{n-1}$, and $Y_k^{n-1}$ can be added, when a matrix index is out of range.

Steps 325 and 335 are repeated until the finest scale of the local similarity pyramids (i.e., the 0th scale) is reached (step 330). In step 340, element-wise normalization is performed on the finest-scale local feature matrices to form the local weight matrices. The local weight matrix $U_k$ associated with the 0th scale of the k th source image can be computed using the following equation:

$$[U_k]_{ind} = \frac{[Y_k^0]_{ind}}{\sum_{m=0}^{K-1} [Y_m^0]_{ind}} \quad (28)$$

Computing Global Weight Vectors and Computing Final Weight Matrices

Figure 4:
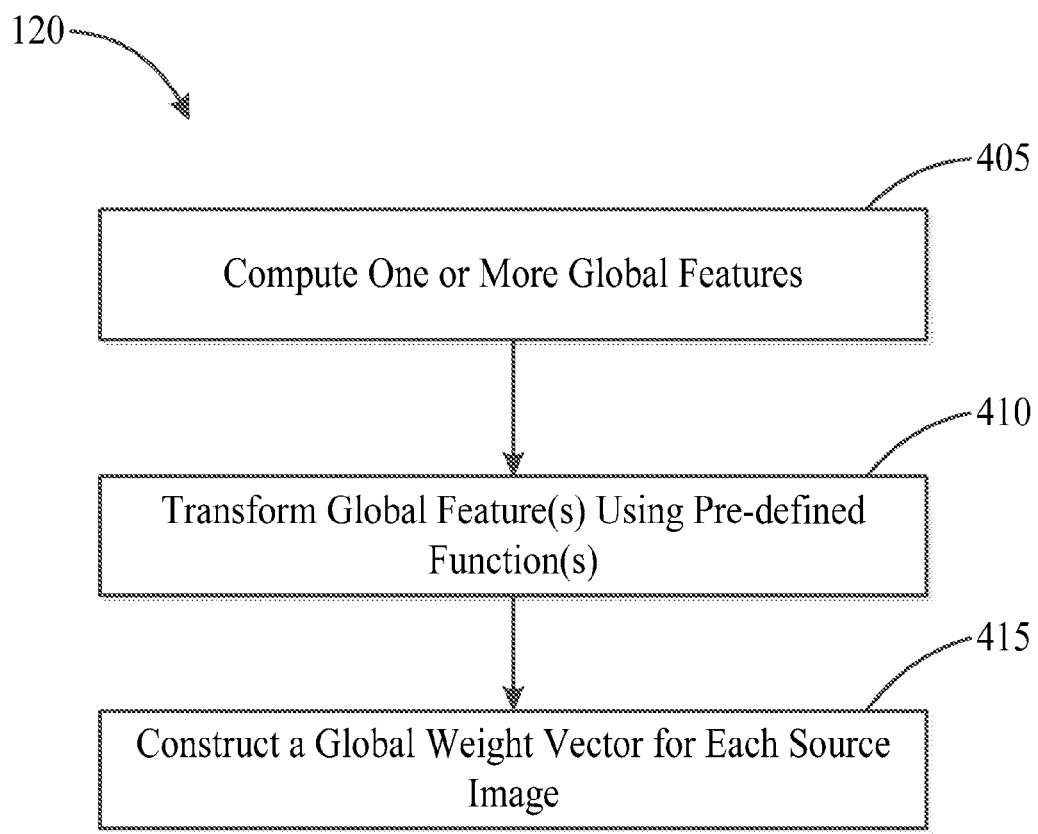
FIG. 4 is a flow chart illustrating the procedure of computing global weight vectors according to an aspect of the present disclosure.

FIG. 4 further illustrates step 120 of computing global weight vectors. In step 405, one or more global features are computed for individual source images and/or for some source images and/or for all source images. A global feature herein represents a certain characteristic of one or more source images. Examples of a global feature include but are not limited to average luminance of one, some or all source images, average color saturation of one, some, or all source images, difference between the average luminance of one non-empty set of source images and that of another non-empty set of source images, and difference between the average color saturation of one non-empty set of source images and that of another non-empty set of source images. In step 410, the global features are transformed using pre-defined function(s). Unlike local weight matrices, which only affect local characteristics of the fused image, these global weight vectors affect global characteristics of the fused image. In step 415, a global weight vector for each source image can be constructed by concatenating the global weights associated with that source image. The elements of a global weight vector can be stored as a vector or in a matrix.

In order for both local features and global features to contribute to the fused image, the local weight matrices and the global weight vectors are combined using a pre-defined function to form a final weight matrix for each source image, as depicted in step 125 in FIG. 1.

For example, in an aspect, steps 120 and 125 can be performed as follows, where the global weight vectors contribute to enhanced global contrast of the fused image.

In step 405, the average luminance of all source images is computed. Let $\bar{L}$ denote the average luminance of all source images. In step 410, $\bar{L}$ can be transformed by two non-liner functions, which results in two global weights, denoted by $V_0$ and $V_1$. The two non-linear functions can take the following forms:

$$V_0 = \alpha_0 + \beta_0 \exp(-\bar{L}) \quad (29)$$

$$V_1 = \alpha_1 + \beta_1 \exp(-\bar{L}) \quad (30)$$

where $\alpha_0$, $\alpha_1$, $\beta_0$, and $\beta_1$ are free parameters. Let $V_k$ denote the global weight vector for the k th source image. In step 415, $V_k$ can be constructed by concatenating $V_0$ and $V_1$, i.e., $V_k=(V_0, V_1)$.

In step 125, the global weight vectors ($V_k$'s) and the local weight matrices ($U_k$'s) are combined to generate the final weight matrices ($X_k$'s). Let $[T]_i$ denote the i th element in a vector T. The combination function can take the following form:

$$X_k = [V_k]_0 U_k - [V_k]_1 \quad (31)$$

In this embodiment, the contribution of the global feature $\overline{L}$ to the fused image is enhanced global contrast. If $\overline{L}$ is low, it indicates that the amount of under-exposed image regions in the source images may be large. Hence, in step 410, Equation 26 results in a larger $V_0$ and Equation 27 results in a larger $V_1$, when $\beta_0$ and $\beta_1$ are positive. When global weight vectors are combined with local weight matrices in step 125 using Equation 28, $[V_k]_0$ helps to increase the global contrast of a fused image, i.e., to extend the dynamic range of a fused image; and $[V_k]_1$ helps to select the middle portion of the extended dynamic range avoiding over- or under-exposure in a fused image.

As another example, in an alternative embodiment, steps 120 and 125 can be performed as follows, where global weight vectors contribute to both enhanced global contrast and enhanced brightness in the fused image.

In step 405, the average luminance of each source image and the average luminance of all source images are computed. Let $\overline{L}_k$ denote the average luminance of the k th source image, and let $\overline{L}$ still denote the average luminance of all source images. In step 410, $\overline{L}$ is transformed in the same way as previously described, which results in two global weights, $V_0$ and $V_1$. Let $V_{2,k}$ denote the global weight computed from $\overline{L}_k$. $V_{2,k}$ can be computed by transforming $\overline{L}_k$ using the following function:

$$V_{2,k} = \begin{cases} \delta \overline{L}_k, & \overline{L}_k > \eta; \\ 0, & \text{otherwise.} \end{cases} \quad (32)$$

where $\delta$ and $\eta$ are free parameters. In step 415, $V_k$ can be constructed by concatenating $V_0$, $V_1$, and $V_{2,k}$, i.e., $V_k=(V_0, V_1, V_{2,k})$.

In step 125, a final weight matrix $X_k$ can be computed by combining the global weight vectors ($V_k$'s) and the local weight matrices ($U_k$'s) in the following way:

$$X_k = [V_k]_0 U_k - [V_k]_1 + [V_k]_2 \quad (33)$$

In this embodiment, the contribution of the global feature $\overline{L}$ to the fused image is the same as that in the previous embodiment, i.e., enhanced global contrast. The contribution of the global feature $\overline{L}_k$ to the fused image is enhanced brightness. $V_{2,k}$'s computed from Equation 29 in step 405 favor those image regions from source images with higher average luminance values, i.e., from brighter source images, when $\delta$ is positive. When global weight vectors are combined with local weight matrices in step 125 using Equation 30, image regions with more local features in those brighter source images can receive higher weights from the final weight matrices, so that those image regions look brighter in a fused image.

A System

Figure 5:
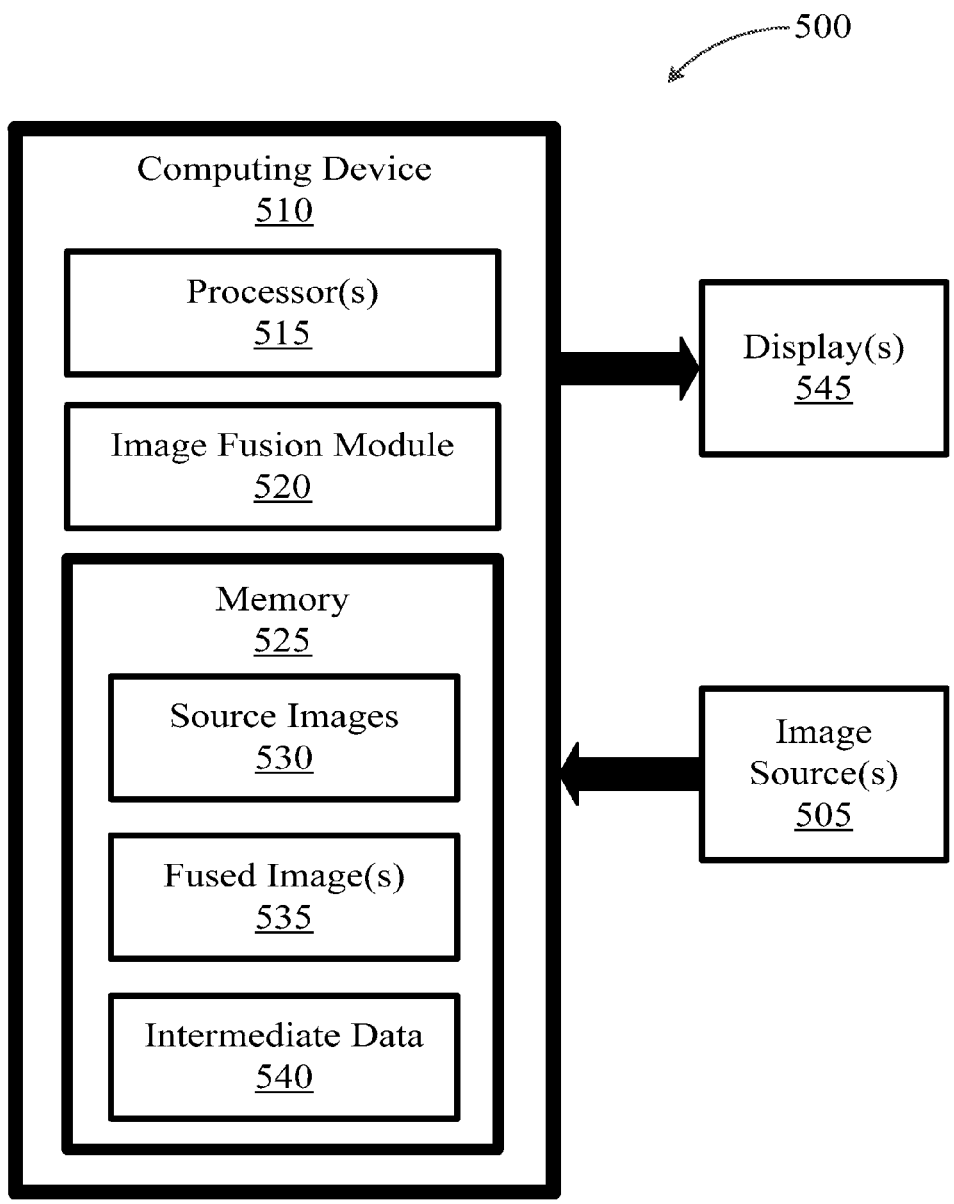
FIG. 5 is a block diagram illustrating an image fusion system according to an aspect of the present disclosure.

FIG. 5 depicts an exemplary image fusion system 500. The image fusion system 500 includes image source(s) 505, a computing device 510, and display(s) 545. The image source(s) 505 can be one or more image sensors or one or more image storage devices. Examples of the computing device 510 include but are not limited to a personal computer, server, computer cluster, and a smart phone. The computing device 510 includes three interconnected components: processor(s) 515, an image fusion module 520, and memory 525. Processor(s) 515 can be a single processor or multiple processors. Examples of a processor include but are not limited to a central processing unit (CPU) and a graphics processing unit (GPU). Memory 525 stores source images 530, fused image(s) 535, and intermediate data 540. Intermediate data 540 are used and/or generated by the processor(s) 515 and the image fusion module 520. The image fusion module 520 contains processor executable instructions, which can be executed by the processor(s) 515 one or more times to compute fused image(s) 535 from the source images 530 following the image fusion procedure 100. Image fusion module 520 may be incorporated as hardware, software or both, and may be within computing device 510 or in communication with computing device 510.

The system 500 functions in the following manner. The image source(s) 505 sends source images 530 to the computing device 510. These source images 530 are stored in the memory 525. The image fusion module 520 uploads instructions to the processor(s) 515. The processor(s) 515 executes the uploaded instructions and generates fused image(s) 535. The fused image(s) 535 is then sent to display(s) 545.

The above-described embodiments have been provided as examples, for clarity in understanding the present disclosure. A person with skill in the art will recognize that alterations, modifications and variations may be effected to the embodiments described above while remaining within the scope as defined by claims appended hereto.

I claim:

1. A method of producing a fused image, comprising the steps of:
   a) receiving, at a computing device, a plurality of source images;
   b) determining, at the computing device, a local feature matrix for each of the source images, for a feature of each of the source images;
   c) determining, at the computing device, a local weight matrix for each of the source images, using the local feature matrix associated with the source image;
   d) determining, at the computing device, a global weight vector for each of the source images;
   e) determining, at the computing device, a final weight matrix for each of the source images, using the local weight matrix and global weight vector associated with the source image; and
   f) using the final weight matrices for the source images to combine the source images into a fused image.

2. The method of claim 1 wherein in step b) a plurality of scales are included when determining the local feature matrix for each of the source images.

3. The method of claim 2 wherein in step b) a local contrast value is determined for each of the source images.

4. The method of claim 3 wherein the local contrast value is modulated by a sigmoid shaped function.

5. The method of claim 3 wherein each local contrast value has a magnitude, and the magnitude is used to determine the local feature matrix.

6. The method of claim 5 wherein in step c), $\hat{C}_k^n$ denotes a local feature matrix for the kth source image at the nth scale, and $\hat{C}_k^n$ is expressed as:

$$[\hat{C}_k^n]_{ind} = \begin{cases} [\tilde{C}_k^n]_{ind}, & n = 0; \\ func([\tilde{C}_k^n]_{ind}, [[\tilde{C}_k^n]_{ind}, [[\tilde{C}_k^n]^{\downarrow f}]_{ind}), & 1 \le n \le N_c - 1. \end{cases}$$

wherein $N_c$ is a predefined number of scales used in determining the local feature matrices, $\hat{C}_k^n$ is a matrix of the magnitudes of the local contrast values; $[M]_{ind}$ denotes an element of a matrix M, where the location of the element in the matrix M is indicated by an index vector ind; $[M]^{\downarrow f}$ denotes an operator of down sampling a matrix M by a factor f in each dimension; and func(•,•) is a set function.

7. The method of claim 6 wherein func(•,•) is a maximum function for selection of the maximum of first and second input values, so that $\hat{C}_k^n$ is expressed as:

$$[\hat{C}_k^n]_{ind} = \begin{cases} [\tilde{C}_k^n]_{ind}, & n = 0; \\ \max([\tilde{C}_k^n]_{ind}, [[\tilde{C}_k^{n-1}]^{\downarrow f}]_{ind}), & 1 \le n \le N_c - 1. \end{cases}$$

8. The method of claim 3 wherein in step b) the local contrast values are expressed as:

$$[C_k^n]_{ind} = \begin{cases} [\psi \otimes G_k^n]_{ind}, & \text{if}[\phi \otimes G_k^n]_{ind} < \theta; \\ [\psi \otimes G_k^n]_{ind} / [\phi \otimes G_k^n]_{ind}, & \text{otherwise}. \end{cases}$$

wherein $C_k^n$ denotes the matrix of local contrast values determined for a k th source image $I_k$ at a n th scale; $[M]_{ind}$ denotes an element of a matrix M, where the location of the element in the matrix M is indicated by an index vector ind; ψ denotes a filter; φ denotes a low-pass filter; ⊗ denotes an operator of convolution; $G_k^n$ denotes the n th scale of the k th source image; and θ is a free parameter.

9. The method of claim 3 wherein color saturation is used with the local contrast values.

10. The method of claim 1, wherein in step c) a plurality of scales are included when determining the local weight matrix for each of the source images.

11. The method of claim 10 wherein a local similarity matrix is constructed to store similarity values between adjacent image regions.

12. The method of claim 11 wherein a local similarity pyramid is constructed for each local similarity matrix.

13. The method of claim 12 wherein a set function is used to compute the local similarity pyramids.

14. The method of claim 12 wherein a binary function is used to compute the local similarity pyramids.

15. The method of claim 14 wherein the binary function is:

$$[W_d^{n+1}]_{ind} = \min([W_d^n]_{2*ind}, [W_d^n]_{2*ind}^{\rightarrow d})$$

wherein $W_d^n$ denotes the similarity matrix for the direction d at the n th scale; $[M]_{ind}$ denotes an element of a matrix M, where a location of this element in the matrix M is indicated by an index vector ind; $[M]_{ind}^{\rightarrow d}$ denotes a matrix element that is closest to the matrix element $[M]_{ind}$ in the direction d; and * denotes the operator of multiplication.

16. The method of claim 1 wherein in step d):
d.1) at least a global feature is determined for at least one source image;
d.2) the global feature is transformed using a pre-defined function; and
d.3) a global weight vector is constructed for each source image using the transformed global feature.

17. The method of claim 16 wherein the global feature is an average luminance of all of the source images.

18. The method of claim 17 wherein the average luminance, $\bar{L}$, is transformed to obtain two global weights denoted by $V_0$ and $V_1$, by two non-liner functions:

$$V_0 = \alpha_0 + \beta_0 \exp(-\bar{L})$$

$$V_1 = \alpha_1 + \beta_1 \exp(-\bar{L})$$

wherein $\alpha_0$, $\alpha_1$, $\beta_0$, and $\beta_1$ are free parameters.

19. The method of claim 18 wherein, the global weight vector, $V_k$ for the kth source image, is constructed by concatenating $V_0$ and $V_1$, so that $V_k = (V_0, V_1)$.

20. The method of claim 18 wherein a final weight matrix $X_k$ is computed by combining the global weight vectors ($V_k$s) and the local weight matrices ($U_k$s) using:

$$X_k = [V_k]_0 U_k - [V_k]_1$$

wherein $[T]_i$ denotes the i th element in a vector T.

21. The method of claim 16 wherein the global feature is an average luminance of each source image.

22. The method of claim 21 wherein global weight, $V_{2,k}$ is calculated by $$V_{2,k} = \begin{cases} \delta \bar{L}_k, & \bar{L}_k > \eta; \\ 0, & \text{otherwise}. \end{cases}$$

wherein $\bar{L}_k$ denotes the average luminance of the k th source image, and δ and η are free parameters.

23. The method of claim 22 wherein, the global weight vector, $V_k$ for the kth source image, is constructed by concatenating $V_0$ and $V_1$, and $V_{2,k}$, so that $V_k = (V_0, V_1, V_{2,k})$ wherein $V_0$ and $V_1$ are global weights determined by two non-liner functions:

$$V_0 = \alpha_0 + \beta_0 \exp(-\bar{L})$$

$$V_1 = \alpha_1 + \beta_1 \exp(-\bar{L})$$

wherein $\alpha_0$, $\alpha_1$, $\beta_0$, and $\beta_1$ are free parameters.

24. The method of claim 23 wherein a final weight matrix $X_k$ is computed by combining the global weight vectors ($V_k$s) and the local weight matrices ($U_k$s) using:

$$X_k = [V_k]_0 U_k - [V_k]_1 + [V_k]_2$$

and wherein $[T]_i$ denotes the i th element in a vector T.

25. The method of claim 1 wherein in step e) the local weight matrix and global weight vector for each source image are combined using a predetermined combination function.

26. A system for fusing images, comprising:
a) a computing device having a processor and a memory; the memory configured to store a plurality of source images;
b) processing means for fusing an image, comprising:
  i. means for determining a local feature matrix for each of the source images, for a feature of each of the source images;
  ii. means for determining a local weight matrix for each of the source images, using the local feature matrix associated with the source image;
  iii. means for determining a global weight vector for each of the source images;

iv. means for determining a final weight matrix for each of the source images, using the local weight matrix and global weight vector associated with the source image; and
v. means for using the final weight matrices for the source images to combine the source images into a fused image.

27. The system of claim 26 further comprising an image source for providing the source images.

28. The system of claim 27 wherein the image source is an image sensor.

29. The system of claim 28 wherein the means for fusing an image is stored within processor executable instructions of the computing device.

30. The system of claim 28 wherein the means for fusing an image are within a software module.

31. The system of claim 28 wherein the means for fusing an image are within a hardware module in communication with the processor.

* * * * *

UNITED STATES PATENT AND TRADEMARK OFFICE
CERTIFICATE OF CORRECTION

PATENT NO. : 9,053,558 B2  
APPLICATION NO. : 13/952495  
DATED : June 9, 2015  
INVENTOR(S) : Rui Shen Page 1 of 1

It is certified that error appears in the above-identified patent and that said Letters Patent is hereby corrected as shown below:

On the title page, under the (71) Applicant delete "Rui Shen, Edmonton (CA)"
and insert -- Rui Shen, San Jose, CA (US) --

On the title page, under the (72) Inventor delete "Rui Shen, Edmonton (CA)"
and insert -- Rui Shen, San Jose, CA (US) --

Signed and Sealed this
Sixth Day of October, 2015

Michelle K. Lee
*Director of the United States Patent and Trademark Office*